United States Patent
Borgen

[19]

[11] Patent Number: 6,155,530
[45] Date of Patent: Dec. 5, 2000

[54] MOUNTING FOOT DEVICE FOR HI-FI EQUIPMENT

[76] Inventor: Terje Borgen, Glenneveien 43, N-1476, Rasta, Norway

[21] Appl. No.: 08/981,934
[22] PCT Filed: Jul. 29, 1996
[86] PCT No.: PCT/NO96/00194
§ 371 Date: Jan. 12, 1998
§ 102(e) Date: Jan. 12, 1998
[87] PCT Pub. No.: WO97/04687
PCT Pub. Date: Feb. 13, 1997

[30] Foreign Application Priority Data

Jul. 31, 1995 [NO] Norway ..................... 953021
Nov. 6, 1995 [NO] Norway ..................... 954429

[51] Int. Cl.[7] .................................................. F16M 1/00
[52] U.S. Cl. .................. 248/638; 248/633; 248/188.9; 16/42 R
[58] Field of Search .................. 248/638, 632, 248/633, 634, 188.8, 188.9; 381/386, 388, 392, 333; 181/207, 209; 16/42 R

[56] References Cited

U.S. PATENT DOCUMENTS

| Re. 14,964 | 10/1920 | Anderson | 16/42 R |
|---|---|---|---|
| 1,334,496 | 3/1920 | Johnson | 16/42 R |
| 2,116,941 | 5/1938 | Francis | 16/42 R |
| 2,762,405 | 9/1956 | Gulland | 16/42 R |
| 5,169,104 | 12/1992 | Kwoh | 248/638 X |
| 5,310,156 | 5/1994 | Matsumura et al. | 248/615 |
| 5,330,165 | 7/1994 | Van Goubergen | 248/633 X |
| 5,499,791 | 3/1996 | Nakagawa et al. | 248/638 |
| 5,681,023 | 10/1997 | Sheydayi | 248/638 |
| 5,738,330 | 4/1998 | Folkens et al. | 248/632 |

FOREIGN PATENT DOCUMENTS

| 2141182 | 1/1973 | France. | |
|---|---|---|---|
| 2364816 | 10/1975 | Germany | 248/634 |
| 2600782 | 7/1977 | Germany. | |
| 3629256 | 3/1988 | Germany. | |
| 838254 | 6/1960 | United Kingdom | 16/42 R |
| 2281693 | 3/1995 | United Kingdom. | |

*Primary Examiner*—Anita M. King
*Assistant Examiner*—Gwendolyn Baxter
*Attorney, Agent, or Firm*—Venable; George H. Spencer; Robert Kinberg

[57] ABSTRACT

A mounting foot device for hi-fi equipment to prevent or limit acoustic feedback, comprising: an anchor bolt for affixing to said equipment, the bolt including a downward facing end face provided with a projecting spike; a housing which partially surrounds the bolt, and wherein the bolt has axial, but limited, movability in relation to the housing; a contact plate, either fixedly mounted in the housing or mounted with limited axial mobility in relation to the housing, and including an upper face and a lower face wherein the upper face is positioned facing toward the end face of the anchor bolt and the projecting spike, and is adapted to form a point contact with the spike and wherein when the bolt is under the weight of the hi-fi equipment, the bolt moves toward the contact plate.

29 Claims, 7 Drawing Sheets

MOUNTING FOOT DEVICE FOR HI-FI EQUIPMENT

BACKGROUND OF THE INVENTION

The invention relates to a mounting foot device for hi-fi equipment, such as, e.g., loudspeakers, to prevent or limit acoustic feedback. The function of such mounting feet is to provide optimal mechanical contact with the base surface. The mounting foot is based on the known principle that the greater the weight per surface unit of a product, the less feedback there will be. By minimizing the equipment's contact surface with the base, the weight per surface unit (e.g., sq. cm.) is increased. The best solution is thus to arrange for the tangent surface to be no more than a point against the base. This provides for greater mechanical stability and maximum reduction of acoustic feedback, which increases the clarity and distinctness of the sound.

Due to the wide variety of hi-fi equipment, e.g., loudspeakers and apparatuses such as CD players and record players, which advantageously could be equipped with a foot capable of reducing acoustic feedback, there is need for several variations of such a foot in order to meet the requirements for design and weight.

A substantial number of loudspeakers today are delivered with two different types of feet. One consists of a point or spike that takes care of the advantages described above. This is screwed underneath the loudspeaker, and with one of these in each corner there will be four feet having only a small surface of contact with the base. As an alternative, loudspeakers usually are also delivered with a foot having felt or cork underneath, for such points or spikes understandably can cause damage to the floor, and this should be possible to avoid. All tests indicate, however, that such points/spikes do improve the sound quality considerably.

It is also possible to obtain a brass plate having a cork facing underneath to place under the spikes. At the outset, this is not merely for protection of the floor but is equally important for the sound quality, as it provides an even smaller vertical contact surface than that of the spike directly on the floor, since the spike is pressed slightly down into the floor, thus increasing the contact surface. Of course, it will also protect the floor, but before the brass discs have been placed under the loudspeaker feet, there will still be a problem.

SUMMARY OF THE INVENTION

The invention aims to preserve the acoustic advantages of spikes in a novel manner, while simultaneously protecting the floor or shelves against the spikes.

For heavy floor loudspeakers and loudspeaker racks, a strong or heavy foot should be used. For lighter floor loudspeakers and loudspeaker racks and for hi-fi furniture a simpler foot may be used.

For sensitive apparatuses such as CD players and record players, as well as for bookshelf loudspeakers, a flat foot may be very suitable. As there are many different methods of affixing the feet, it is necessary to have the capability of varying the attachment possibilities. Also, loudspeakers and other equipment are available in a wide range of qualities, and it must be possible to offer feet providing different solutions for safeguarding the quality that the loudspeaker or equipment would otherwise have. There are also some floor-standing loudspeakers which are very heavy and therefore require a more massive foot.

The features of the device that are characteristic for the invention and the embodiments thereof are disclosed in the attached patent claims.

BRIEF DESCRIPTION OF THE DRAWINGS

The invention will now be described further with reference to the attached drawings.

FIG. 1 is a direct frontal view of the foot, while FIG. 2 shows a cross section of the foot.

FIG. 3 is a direct frontal view of the foot, while FIG. 4 shows a cross section of the foot.

FIG. 5 is a direct frontal view of the foot, while FIG. 6 shows a cross section of the foot.

FIG. 7 is a direct frontal view of the foot, while FIG. 8 shows a cross section of the foot.

FIG. 10 is a direct frontal view of the foot, while FIG. 11 shows a cross section of the foot.

FIG. 12 is direct frontal view of the foot, while FIG. 13 shows a cross section of the foot.

FIG. 14 is a direct frontal view of the foot, while FIG. 15 shows a cross section of the foot.

DETAILED DESCRIPTION OF THE INVENTION

The principle of the invention is the same for the various types of feet that are described. This principle is based on a massive, solid unit, e.g., a bolt, being securely affixed to the hi-fi equipment. The unit will terminate in a point (or spike) at the end remote from the equipment. It functions, so far, in the same manner as the known spike described above. The difference resides in the feature that the unit according to the invention is designed to fit inside a surrounding casing or housing.

The housing that encloses the bolt will have an internal metal plate provided at the bottom thereof, and a facing of cork, felt or similar material beneath it to protect the floor. The relationship between the bolt and the housing will be such that the housing is allowed a slight freedom of movement in the vertical plane. When the apparatus is lifted or moved, the housing will be caught by and depend from the bolt; when the apparatus is set down, the housing will remain standing on the base surface and the bolt will move downward within the housing until the spike hits the metal plate, and the point of contact between the bolt and the metal plate will represent the desired contact surface between the apparatus and the base.

For all of the feet, the parts preferably will all have a round shape when viewed from above or below.

Figure 1:
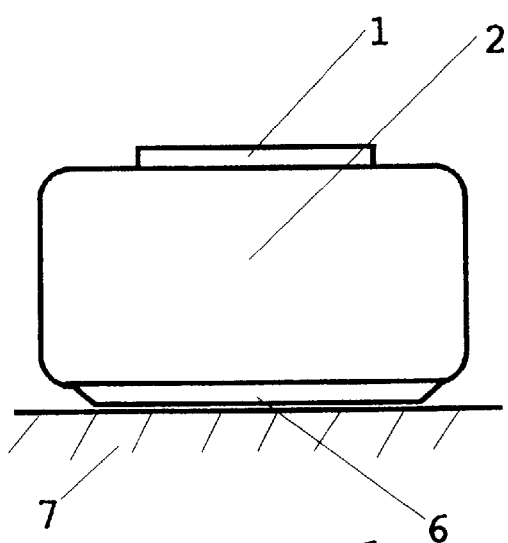
FIGS. 1 and 2 show the mounting foot device intended for smaller and lighter hi-fi equipment, e.g., small loudspeakers and other equipment such as CD players or record players, where
Figure 2:
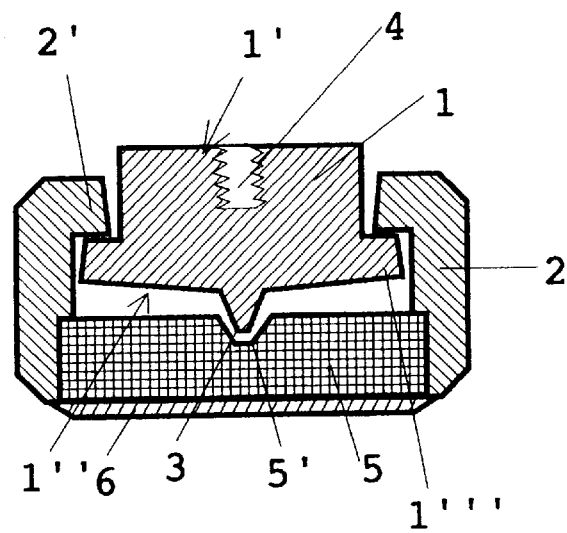
Figure 5:
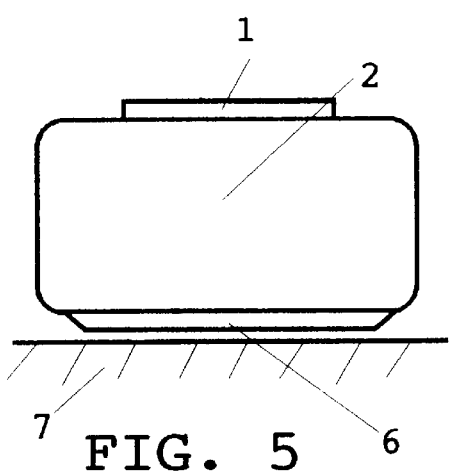
FIGS. 5 and 6 show a first variant of the device in FIGS. 1 and 2 intended for smaller and lighter hi-fi equipment, e.g., small loudspeakers and other equipment such as CD players or record players where
Figure 6:
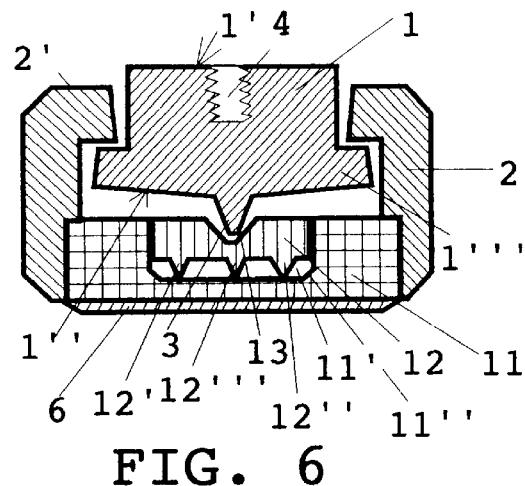
Figure 7:
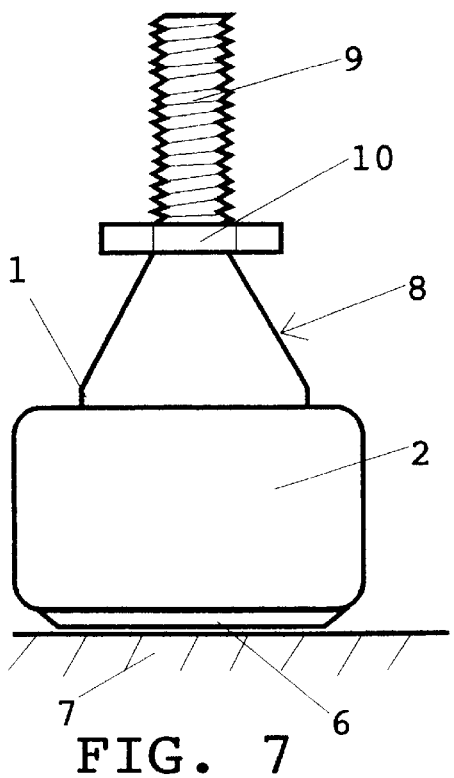
FIGS. 7 and 8 show a first variant of the device in FIGS. 3 and 4 intended for floor-standing loudspeakers and loudspeaker racks as well as hi-fi furniture such as shelves and tables, where
Figure 8:
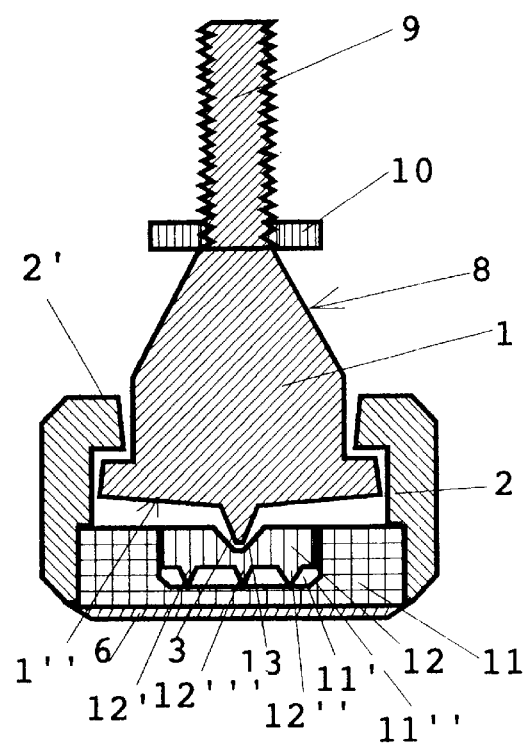
Figure 10:
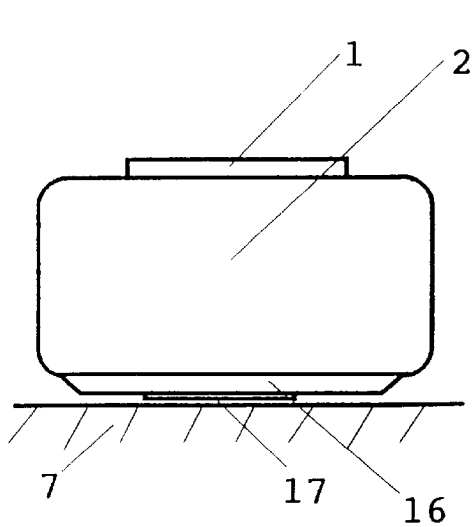
FIGS. 10 and 11 show a second variant of the device in FIGS. 1 and 2 intended for smaller and lighter hi-fi equipment, e.g., small loudspeakers and other equipment such as CD players or record players, where
Figure 11:
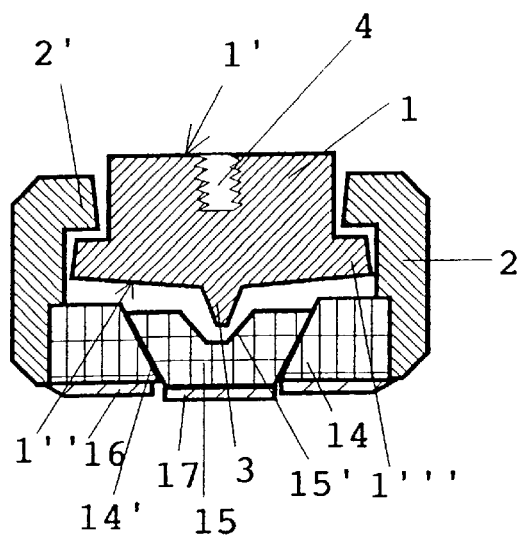

Alternative types of a flat mounting foot for hi-fi equipment, particularly for smaller equipment such as small loudspeakers, are shown in FIGS. 1, 2; 5, 6; and 10, 11, respectively. FIGS. 1, 5 and 10 show a frontal view of the feet, while the respective FIGS. 2, 6 and 11 show a cross section of the feet. The figures show the feet with a flat top for the use of, e.g., double-sided tape or other suitable fastening means for affixing them to the equipment. Other fastening methods may also be appropriate, e.g., a threaded grip enabling the foot to be screwed onto a threaded bolt projecting from the inside of the apparatus.

The mounting foot shown in FIGS. 1 and 2 includes a bolt 1 slidably mounted in relation to a housing 2, where housing 2 has a slightly larger internal diameter than the outer diameter of bolt 1, permitting the bolt to move freely within housing 2. Bolt 1 is a massive, round unit having a possible means of connection provided at one axial end 1' thereof, and is provided with a point (or spike) 3 at the other axial end 1". Bolt 1 is preferably attached to the relevant equipment by double-sided tape (not shown) on surface 1' facing away from spike 3. Other means of attachment will also be feasible, e.g., providing end 4 with a threaded hole, as indicated with dotted lines 4, rendering the hole engageable with a threaded bolt projecting from the relevant equipment. Spike 3, according to the present embodiment form, is positioned at the center of bolt 1. When the equipment is lifted, housing 2 will slide downward along bolt 1 until it remains depending from the projecting collar section 1'" of the bolt. This section 1'" is brought to bear against the underside of an inward projecting, annular section 2' on housing 2. The lower part of housing 2 is provided with a plate 5 forming the bottom of the housing. Plate 5 may be affixed to housing 2 by either force fitting, gluing, welding or screwing. Felt, cork, rubber or the like is placed on the underside of plate 5, as designated with reference numeral 6, and is attached, for example, by gluing.

When the equipment is set down, bolt 1 will slide in relation to housing 2 until spike 3 on bolt 1 contacts plate 5. When this happens, the point of contact between the bolt's spike 3 and plate 5 will constitute the desired, vertical anchoring between the equipment and the base surface 7 for the foot. Plate 5 will preferably be provided with a central depression 5' on one side thereof facing the point, which depression will then also function as a guide for bolt 1 when the equipment is set down. Depression 5' will have an angle of taper, as indicated by FIG. 2, greater than the angle of taper for spike 3 of bolt 1.

Figure 3:
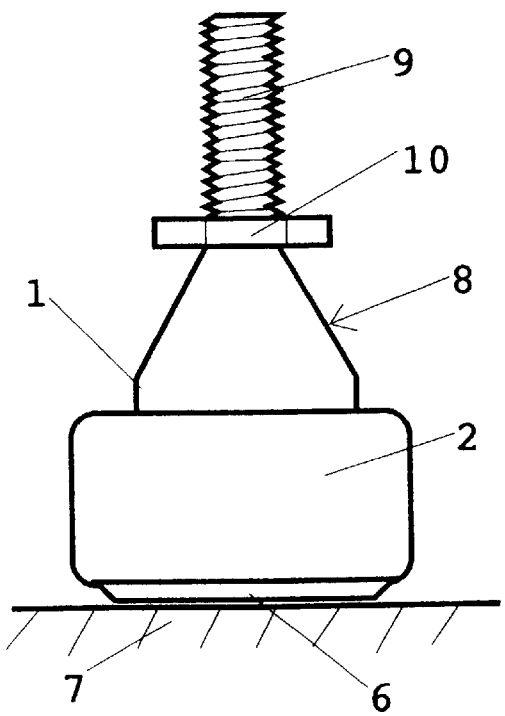
FIGS. 3 and 4 depict the mounting foot device intended for floor-standing loudspeakers and loudspeaker racks as well as hi-fi furniture such as shelves and tables, where
Figure 4:
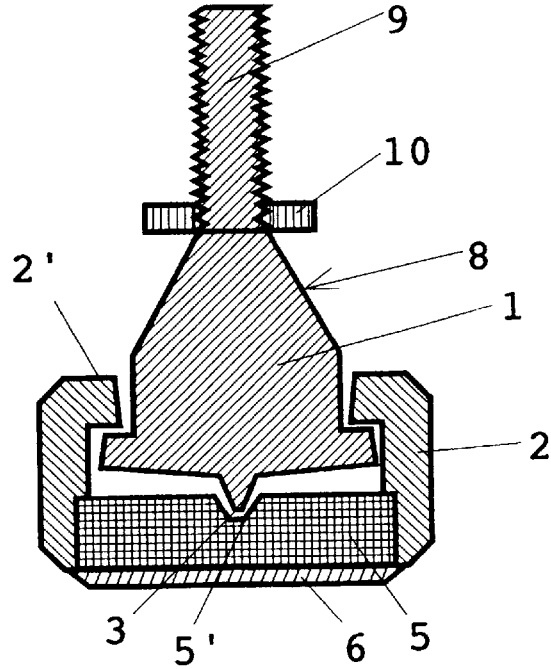

FIGS. 3 and 4 depict a solution wherein housing 2, plate 5, spike 3, depression 5' and facing 6 on the underside of plate 5 have the same embodiment form as that shown and described in connection with FIGS. 1 and 2. In this embodiment, however, the actual bolt-like body has been given a slightly different physical configuration than that shown in FIGS. 1 and 2. The bolt-shaped body will be engageable with housing 2 and plate 5 as shown and described in connection with FIGS. 1 and 2, but on the portion above housing 2, designated by reference numeral 8, it has been given a conical form. The conical form of the upper portion of bolt 1 enables the bolt to taper in gradually toward the top thereof, which top is provided with a threaded head 9. The threaded head 9 is adapted to engage with a nut 10. Nut 10 is attached to the threaded head 9 either by welding or by gluing, the nut 10 being employed when bolt 1 with its head 9 is screwed into the equipment (not shown).

For the subsequent drawings in FIGS. 5–13, only the differences that are present in relation to the respective FIGS. 1, 2, 3 and 4 will be explained.

The elements shown and described in FIGS. 1–4, to the extent that they are identifiable again in FIGS. 5–13, will thus bear the same reference numerals.

Figure 9:
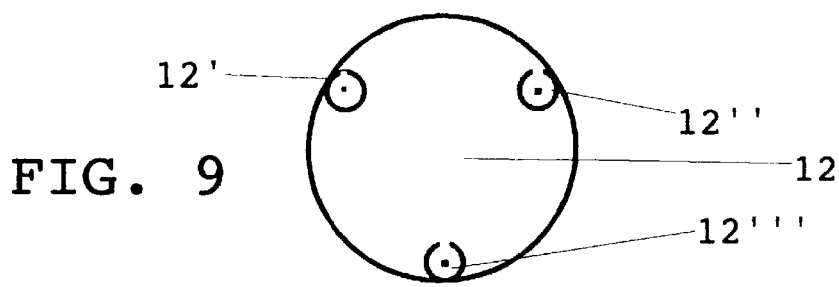
FIG. 9 shows how the points or spikes are placed on a spike plate in FIGS. 6 and 8 where three points or spikes are used, FIG. 9 illustrating the spike plate seen from the underside.

The solution according to FIGS. 5, 6 and 9 shows an alternative that may be relevant for particularly fine equipment, where the plate at the bottom of housing 2 is divided into two coaxially disposed sections 11 and 12. Plate 11 has a recess 11' which at the bottom thereof has a conical narrowing 11". Plate 12 has a diameter slightly smaller than recess 11' in plate 11 and of the same total height (axial extent) as the depth (the axial extent) of the recess 11' in plate 11. Plate 12 is provided with three small spikes 12', 12", 12'", to achieve a "double spike" effect. The angle of taper at the bottom of recess 11' in plate 11 is slightly greater than the angle of taper of spikes 12', 12", 12'" in plate 12. This will have the effect that plate 12 will meet the bottom of recess 11' in plate 11 without anything other than spikes 12, 12", 12'" on plate 12 making contact with the bottom of the plate.

As shown and explained in connection with FIG. 2, plate 12 will be provided with a recess or depression 13 coaxial with spike 3 on bolt 1. The angle of taper, or conicity, of depression 13 will be greater than the conicity of spike 3, permitting spike 3 to be guided down into depression 13.

From FIG. 9 it is apparent that spikes 12', 12", 12 will be spaced apart, preferably at an equal angular distance, along the circular periphery of plate section 12'.

The solution according to FIGS. 10 and 11 shows an alternative that can be relevant for finer equipment. Housing 2 has a two-part bottom consisting of an annular plate 14 and a central plate 15 which is loose relative to plate 14. Plate 14 has a through conical aperture 14'. Plate 15 is conical and has been given the same angle of taper as aperture 14' in plate 14. Plate 15, however, has a slightly smaller diameter than the diameter of aperture 14'. When housing 2 with plate 14 securely mounted thereon is lifted, plate 15 will remain suspended slightly below plate 14, as is clearly apparent from FIG. 11. When housing 2 is set down on the base surface via plate 14 and the facing 16 on the underside thereof, plate 15 with its underlying facing 17 will be displaced slightly upwards in relation to plate 14, and will thereby be released from engagement with plate 14. This means that spike 3 on bolt 1 will become the point or surface of contact with plate 15 when the equipment (not shown)

rests on the foot. Housing 2 and plate 14 will thereby rest on a base 7, free from the influence of bolt 1 and plate 15. Plate 15 is preferably provided with a depression 15', and the angle of taper of depression 15' is slightly greater than the angle of taper of spike 3, enabling spike 3 to be guided more easily down into depression 15'.

The facing or pad 16, e.g., felt, cork or rubber, underneath the plate may advantageously have the same or approximately the same thickness as facing 17 underneath plate 15.

Figure 12:
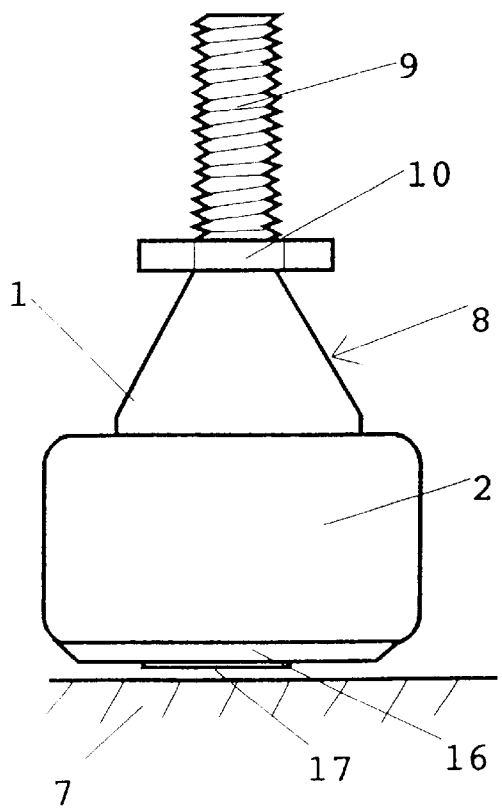
FIGS. 12 and 13 show a second variant of the device in FIGS. 3 and 4 intended for floor-standing loudspeakers and loudspeaker racks as well as hi-fi furniture such as shelves and tables, where
Figure 13:
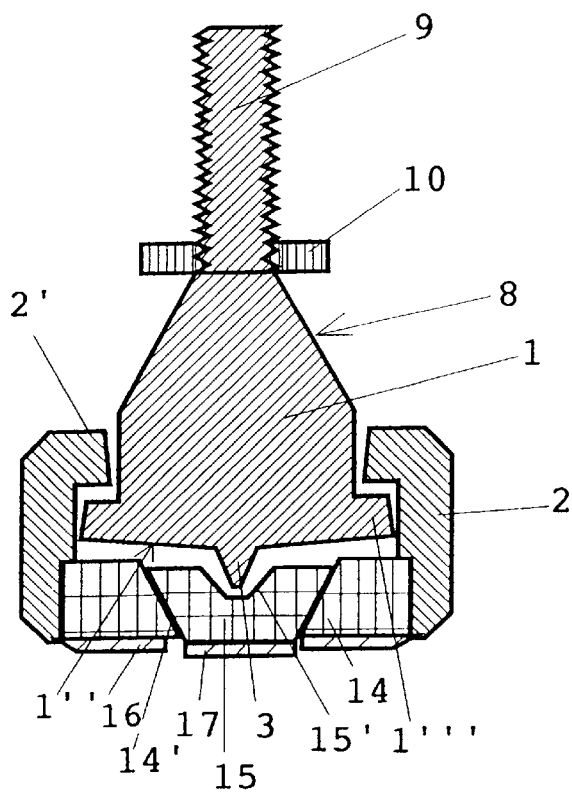

A mounting foot for hi-fi equipment, particularly for floor-standing loudspeakers, loudspeaker racks and hi-fi furniture is also shown in FIGS. 12 and 13, where FIG. 12 shows a direct frontal view of the foot and FIG. 13 shows a cross section of the foot. As will be apparent, bolt 1 has the same form and function as is shown and explained in connection with the embodiment in FIGS. 3, 4 and 7, 8 and will therefore not be explained further. In other respects, the function for the embodiment form in FIGS. 12 and 13 is the same mode of operation as that shown and explained immediately above in connection with FIGS. 10 and 11. Plate 14 may be affixed to housing 2 by means of force fitting, gluing, screwing or another practical method.

The point of contact between the tip (spike) 3 of bolt 1 and the plate, whether this is an integral piece as shown in FIGS. 1–4 or a two-part unit, as shown in FIGS. 5–13, will constitute the desired, vertical anchoring between the equipment and the base 7.

Figure 14:
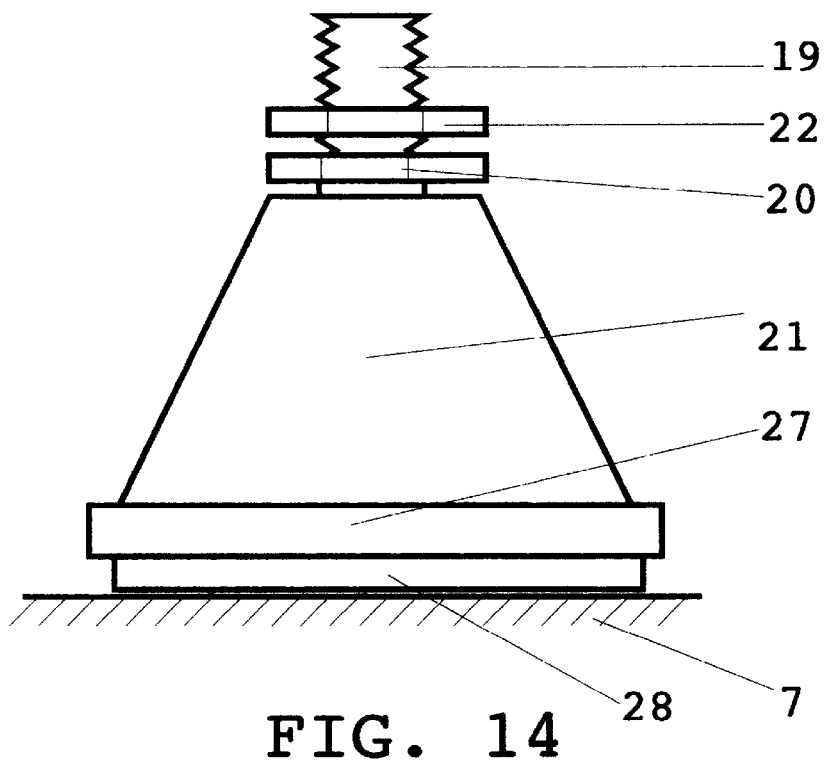
FIGS. 14 and 15 show the mounting foot device intended for larger and heavier hi-fi equipment, e.g., floor-standing loudspeakers and loudspeakers on racks, where
Figure 15:
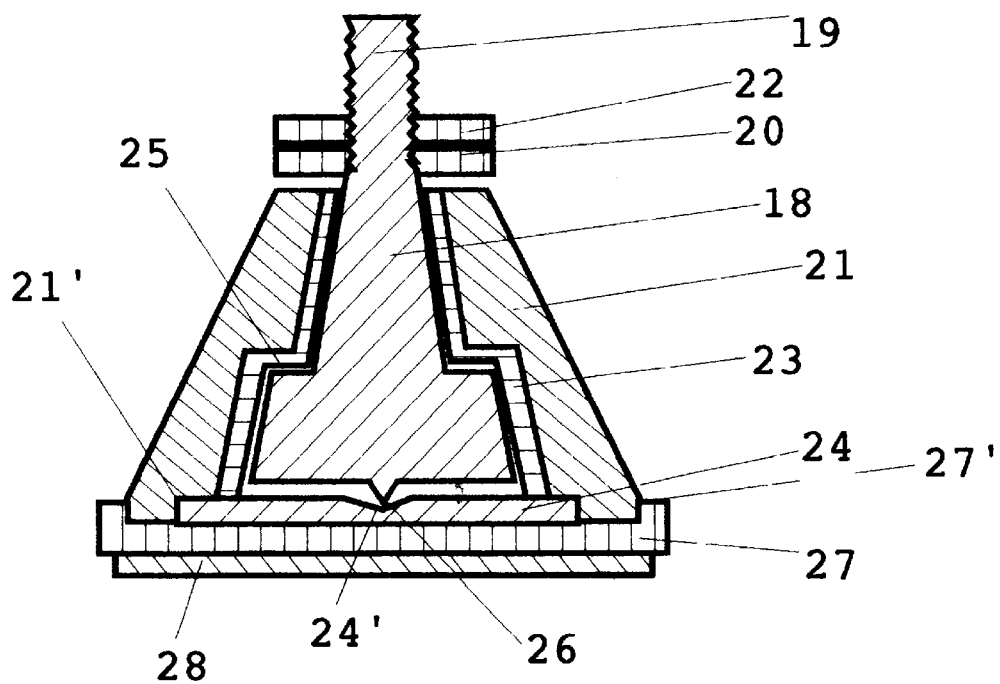

The embodiment form in FIGS. 14 and 15 shows a loudspeaker foot for larger and heavier floor-standing loudspeakers and loudspeakers on racks. FIG. 14 shows a direct frontal view of the foot and FIG. 15 shows a cross section of the foot.

Seen from above, all the parts preferably will have a circular shape. The foot consists of a bolt 18 solidly anchored in the hi-fi equipment, e.g., loudspeaker or loudspeaker rack. Bolt 18 is provided at the top thereof with a threaded head 19 and has a first mounted nut 20 which has been securely glued or welded to the head 19 of bolt 18 after the latter has been mounted in a housing 21. A second nut 22 is a lock nut or counter nut screwable toward the threads in the equipment after the helicoidal head 19 has been screwed thereinto for the purpose of ensuring that bolt 18 does not move after its setting has been adjusted. Housing 21 is preferably made of a massive and soundproof, or non-resonant, material, e.g., aluminum or a suitable plastic material. Housing 21 is also provided with an internal bore to fit bolt 18, a bushing 23 between bolt 18 and housing 21 and an insertable plate 24 at the bottom of housing 21. Plate 24 may be constructed of a material suitable for the purpose, preferably brass or zinc. Other metals or plastic materials for plate 24 are also conceivable.

Bushing 23 should be an insert made of a material which prevents housing 21 from directly touching bolt 18. As a potentially suitable bushing material, a nylon material may be suggested, although other materials including plastic would be conceivable. Bushing 23 will also ensure ease of movement between housing 21 and bolt 22. Except for the portion of bolt 18 that is threaded, i.e., bolt head 19, bolt 18 will be conical in form.

Although it is conceivable that the bored section of housing 21 could have a smooth, inward tapering in its upward direction, it is suggested according to a preferred embodiment of the invention that both the bored section of the housing 21, bushing 23 and bolt 18 be provided with a shoulder area 25. This shoulder 25 allows bolt 18 to be drawn upward a certain distance in relation to housing 21 until the shoulder section on bolt 18 abuts with the shoulder section on bushing 23. The danger of wedging is thereby also limited, at the same time as the basic principles illustrated, inter alia, in FIGS. 1–4 are maintained. Since bolt 18 has the same angle of taper as bushing 23 for, respectively, the portions below and above shoulder area 25, this ensures that housing 21 will be centered on bolt 18 when it is lifted up. Likewise, there will be some clearance between bolt 18 and housing 21 with bushing 23 when the equipment is set down.

When the equipment is lifted, housing 21 will slide down along bolt 18 until it remains suspended on the bolt's shoulder area, generally indicated by reference numeral 25. When the equipment is set down together with the foot, bolt 18 will move within the housing relative to bushing 23 until the tip 26 of bolt 18 meets plate 24. Housing 21 will thereby be well anchored to the base surface via plate 24, a cap 27 securely screwed to housing 21 and a facing or pad 28, e.g., felt, cork, rubber or a plate with similar properties fastened to the underside of cap 27. The point of contact between the tip 26 of the bolt and plate 24 will constitute the desired vertical anchoring between the equipment and base surface 7. Plate 24 may be provided with a slight depression 24' at the center thereof which functions as a guide for bolt 18 when the equipment is set down, as said tip or spike 26 will press down into this recess or depression. Depression 24' has an angle of taper greater than the angle of taper for the bolt's spike 26. Housing 21 has a round, milled recess 21' into which plate 24 fits. Plate 24 is held in place by the aforementioned cap 27. Cap 27 may be securely screwed onto housing 21 via a threaded connection 27'. However, cap 27 could conceivably be attached by shrink fitting, swaging, fix welding or gluing.

Figure 16:
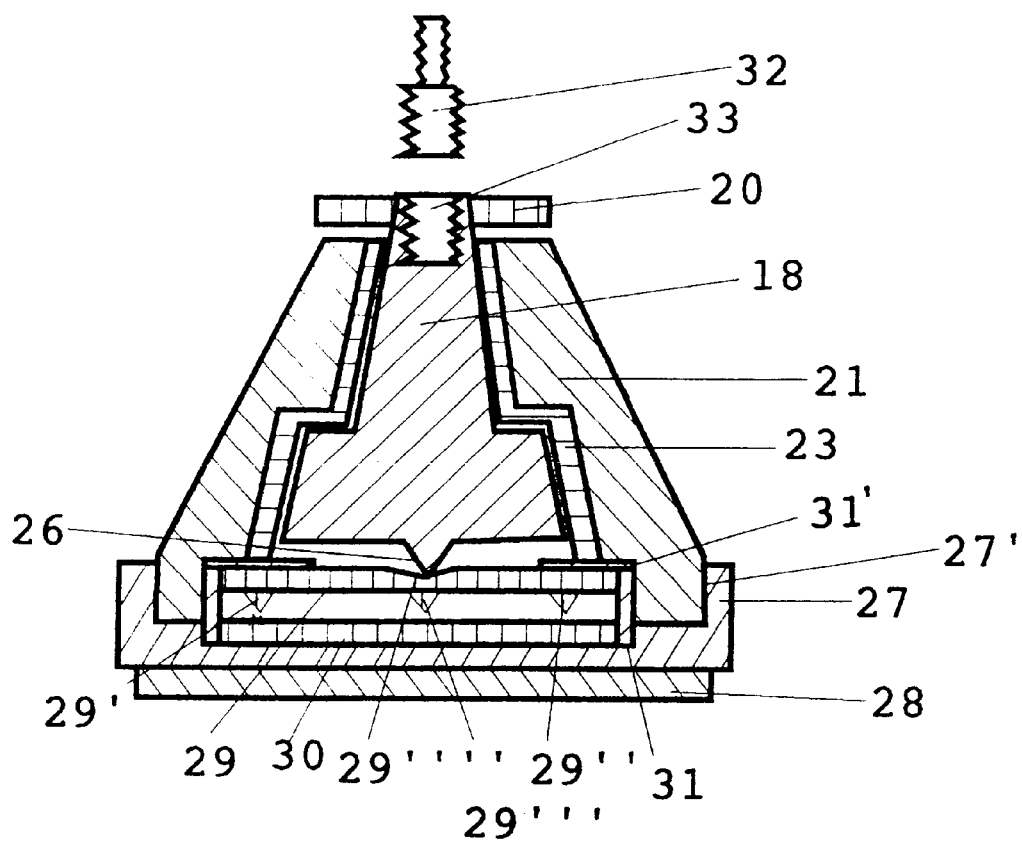
FIG. 16 shows a first variant of the device in FIGS. 14 and 15 intended for larger and heavier hi-fi equipment, e.g., floor-standing loudspeakers and loudspeakers on racks, where the figure shows a cross section of the foot.

FIG. 16 shows an alternative solution that may be relevant for particularly fine equipment where the plate intended to form the contact or bearing surface for spike 26 on bolt 18 is divided into two parts 29 and 30 where the upper part 29 has a slight clearance and is provided with three small spikes 29', 29" and 29''' to achieve a "double spike" effect. In this case the two plates 29 and 20 are movable within a bushing 31. Bushing 31 is held in place by a stop means 31', e.g. a washer. The housing for the foot is designated by reference numeral 21, the anchor bolt as mentioned above by reference numeral 18 and the anchor bolt's adjustment nut by reference numeral 20. Nut 20 is fastened securely to bolt 18 at the upper section thereof, as is clearly shown on FIG. 16. A cap to be mounted on housing 21 to hold plates 29 and 30 in place is indicated with reference numeral 27, as on FIGS. 14 and 15. Cap 27 may form a screw connection with housing 21 via a threaded section 27'.

The facing, e.g., felt, cork, rubber or the like, provided on the underside of cap 27, as shown in FIG. 16, is designated by reference numeral 28. The anchor bolt has a contact spike 26. This contact spike 26 will engage with a depressed sector 29"". The angle of taper for this sector 29"" is greater than the angle of taper for spike 26.

Figure 17:
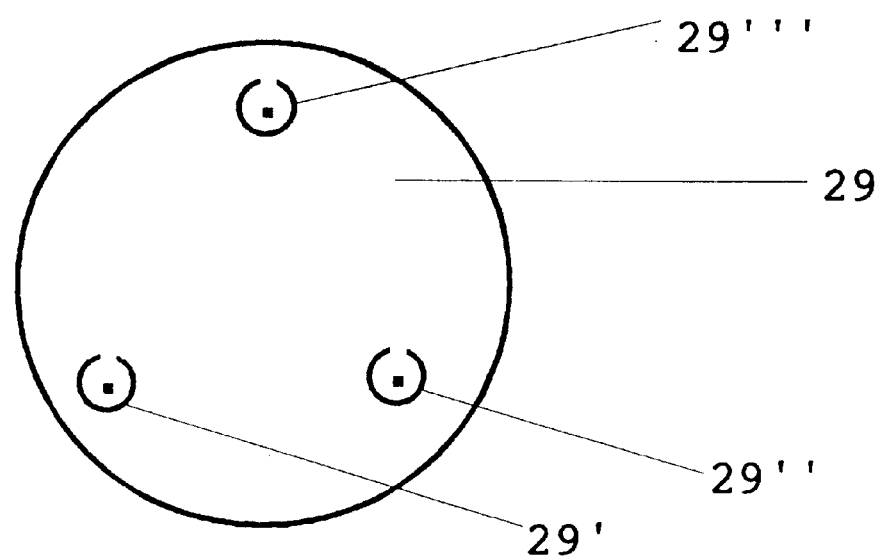
FIG. 17 shows how the points or spikes are placed on a spike plate in FIG. 16, where three points or spikes are used, and where the plate is seen from the underside.

As compared with the solution shown in FIGS. 14 and 15, the embodiment form in FIG. 16 indicates an alternative for attachment, where a threaded unit 32 consisting of a first threaded section and a second threaded section of different diameters is screwed into the equipment. On the uppermost portion of bolt 18, the mounting foot has an internal threaded section 33 into which may be screwed the lower section of the threaded unit 32, while the upper threaded section having a smaller cross section on unit 32 may be screwed into the equipment. FIG. 17 shows plate 29 seen from the underside to illustrate the preferred placement of spikes 29', 29" and 29''' in relation to each other.

Figure 18:
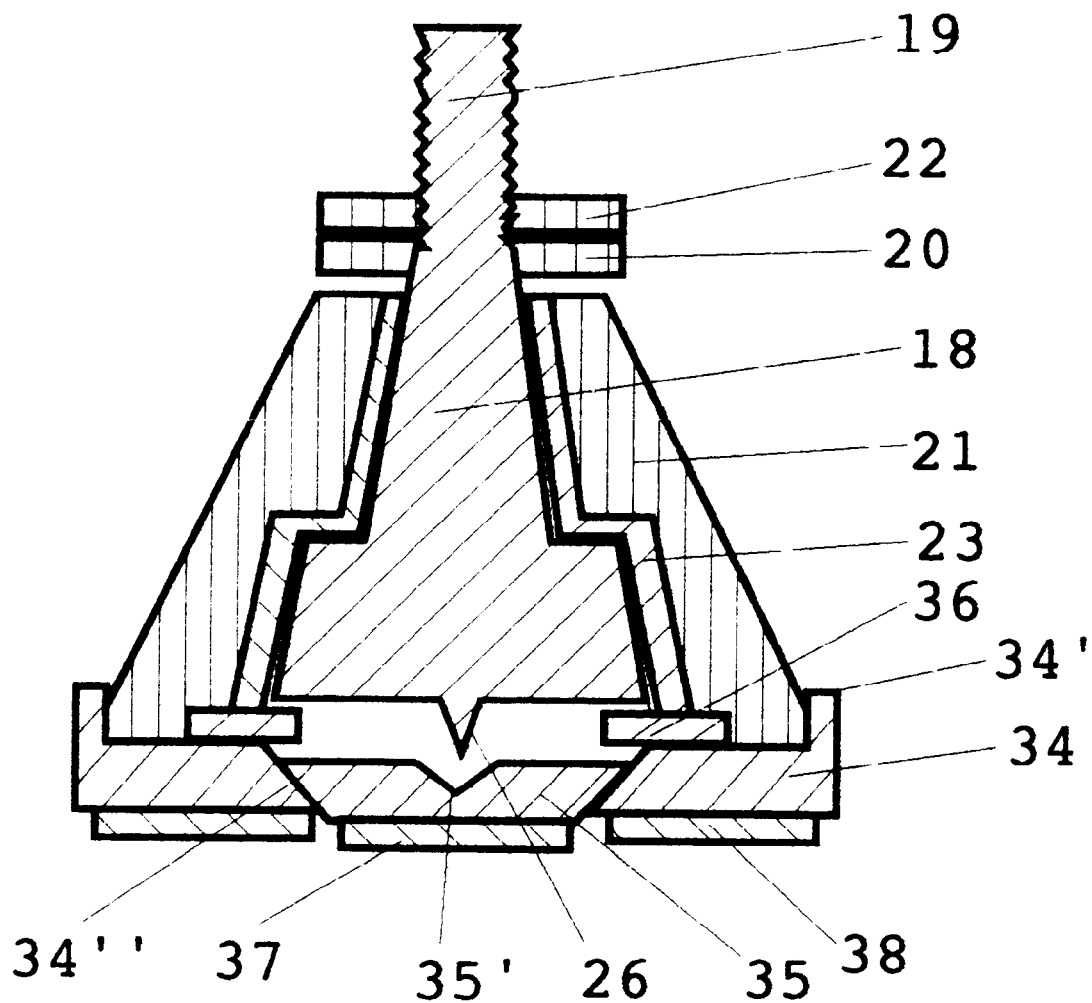
FIG. 18 shows a second variant of the device in FIGS. 14 and 15 intended for larger and heavier hi-fi equipment, e.g., floor-standing loudspeakers and loudspeakers on racks, where the figure shows a cross section of the foot.

FIG. 18 shows a further alternative that may be appropriate where the one plate 35 intended to form the contact surface for the bolt's spike 26 is loose in relation to an annular plate 34 which is attachable to the foot's housing 21 by a threaded connection 34', or alternatively a joint that is glued, riveted, welded, or the like. The annular plate 34 has a through conical aperture 34". Plate 35, centrally positioned in relation to plate 34 and movable in relation thereto is provided with a conical shape of the same angle of taper as aperture 34" in annular plate or cap 34. Plate 35 has a somewhat smaller diameter than the diameter for aperture 34", and plate 35 also has a slightly smaller material thickness than plate 34 so that, on lifting of the foot with housing 21 and plate 34, plate 35 will remain suspended slightly below plate 34. When housing 21 together with plate 34 is set down on the base (on lowering of the equipment toward base surface 7), plate 35 will be displaced slightly upwards in relation to plate 34 and thereby released from engagement with plate 34. This will, in turn have the effect that the bolt's spike 26 will form the point-surface of contact against plate 35 when the equipment (not shown) rests on the foot. Housing 21 and plate 34 (also referred to as a cap) will rest on base 7 in a state virtually free from contact with bolt 18 and plate 35. An annular disc 36 ensures that plate 35 does not move further upwards than is strictly desirable. Since the material thickness of plate 35 is slightly less than the material thickness of plate 34, plate 35 will not touch disc 36 when the equipment is resting on the foot. A facing 37 on the underside of plate 35, e.g., in the form of felt, cork, rubber or the like, may be of the same thickness as the corresponding facing 38 on the underside of plate 34, as is apparent from FIG. 18.

Figure 19:
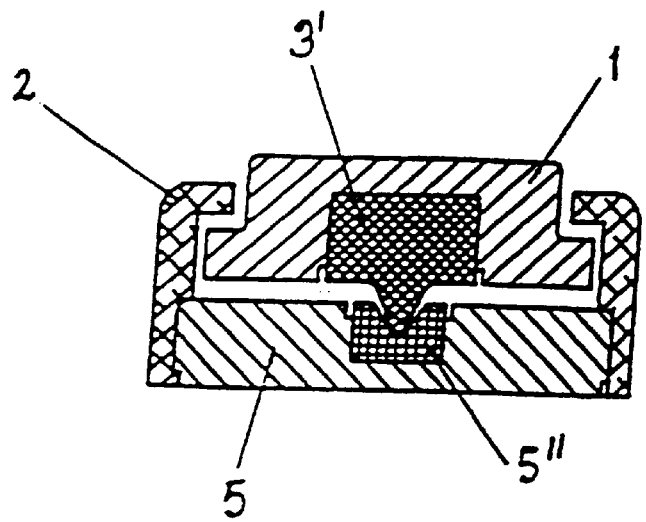
FIG. 19 shows a further modification of the device in FIGS. 1 and 2.
Figure 20:
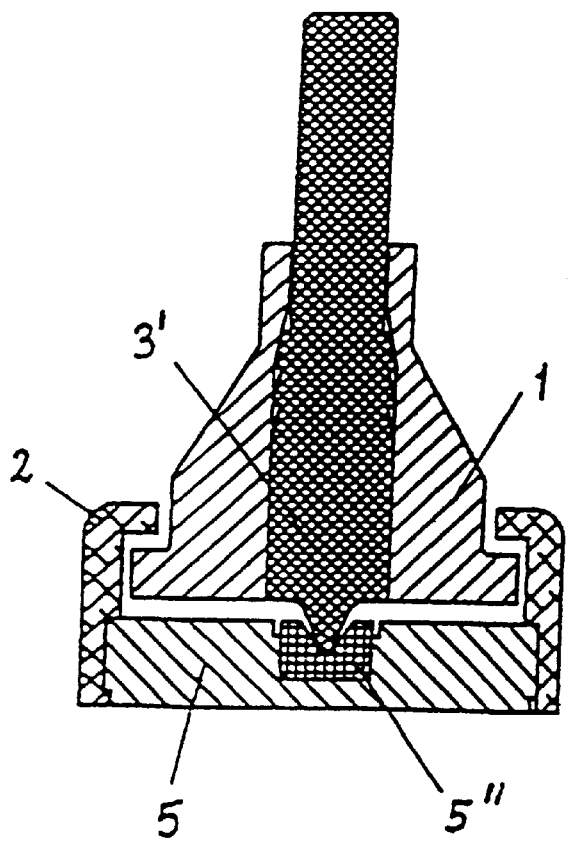
FIG. 20 shows a further modification of the device in FIGS. 3 and 4.

FIGS. 19 and 20 illustrate a further variant of the embodiment form in, respectively, FIGS. 1, 2 and 3, 4. Here, the spike-receiving plate 5 is provided with a spike counterplate 5". Bolt 1 is provided with an embedded tip (spike) 3'. The spike counterplate 5" and the spike 3' are preferably constructed of steel, e.g., case-hardened steel, while plate 5 and bolt 1 are preferably made of zinc. Housing 2 may for practical purposes be fabricated of plastic, e.g., ABS plastic. Due, inter alia, to vibrations from the hi-fi equipment, it would be advantageous for the contact between plate 5 and spike 3' to be as pronounced and invariable as possible. The use of steel for counterplate 5" and embedded spike 3' while the upper part of plate 5 and bolt 1 are made of a different material, such as zinc, improves the quality of the product considerably.

It will reside within the scope of the invention to have capability of modifying the other embodiment forms correspondingly.

For all the embodiment forms for the mounting feet which have been illustrated and described above, various types of materials suitable for the purpose could be utilized. Certain types of plastic could be appropriate as the housing around the bolt. Although the description and figures disclose that the plate or plate sections that are attached to the housing shall face downward toward the base surface, and the bolt shall be affixed to the equipment itself, it is certainly possible as a technical equivalent to envision fastening the housing to the equipment, e.g., via said plate or plates intended to engage with the bolt's spike, by screws, for example, whereupon the spike for the bolt would in that case point upward toward the equipment, and the bolt's head is instead oriented downwards forming a transition to the base surface. This in effect implies that it is possible for the structures illustrated in FIGS. 1–18 to be inverted, or virtually turned upside down.

What is claimed is:

1. A mounting foot device for hi-fi equipment to prevent or limit acoustic feedback, comprising:
   an anchor bolt for affixing to said equipment, the bolt including a downward facing end face, the end face provided with a projecting spike, the projecting spike having a first angle of taper;
   a housing which partially surrounds the bolt, and wherein the bolt has axial, but limited, movability in relation to the housing;
   a contact plate being one of (1) fixedly mounted in the housing and (2) mounted with limited axial mobility in relation to the housing, and including an upper face and a lower face wherein the upper face is positioned facing toward the end face of the anchor bolt and the projecting spike, the projecting spike engaging the upper face of the contact plate in a point contact when the bolt is under the weight of the hi-fi equipment.

2. A device as disclosed in claim 1, wherein the upper face of the contact plate includes a depression for receiving the spike, the depression having a second angle of taper that is greater than the first angle of taper of the bolt's spike.

3. A device as disclosed in claim 2, further including a support plate securely fixed in the housing, the support plate defining a non-through cavity with a bottom surface, and wherein the contact plate is arranged to fit slidably, with limited axial movability, into the non-through cavity, said contact plate being provided on the lower face thereof with three projecting spikes adapted to form a point contact with the bottom surface of the cavity when under said weight of the hi-fi equipment.

4. A device as disclosed in claim 3, wherein the cavity has a depth and the contact plate has a height, and the cavity depth is approximately equal to the contact plate height.

5. The device as disclosed in claim 3, wherein the support plate is comprised of metal.

6. The device as disclosed in claim 5, wherein the support plate is comprised of one of brass and zinc.

7. A device as disclosed in claim 2, further including a support plate securely fixed in the housing, the support plate defining an opening with sides having a third angle of taper, and wherein the contact plate is arranged to fit concentrically and slidably, with limited axial movability, into the opening in the support plate, said contact plate being conical in form with a fourth angle of taper equal to the third angle of taper for said opening, but having a smaller cross section than the cross section of the opening, so that when under the weight of the hi-fi equipment, the contact plate will remain in a position of radial clearance in relation to the support plate.

8. The device as disclosed in claim 7, wherein the support plate is comprised of metal.

9. The device as disclosed in claim 8, wherein the support plate is comprised of one of brass and zinc.

10. A device as disclosed in claim 2, further including a cap, the cap attached to the housing, and wherein the contact plate is retained adjacent to the mounting foot housing with the aid of the cap.

11. A device as disclosed in claim 2, further including
   a cap attached to the housing;
   a bushing having an upper end and a lower end and defining an annular space, and the bushing arranged between the housing and the cap and below the end face of the bolt; and
   a support plate arranged to fit concentrically within the annular space of the bushing and having an upper surface and a lower surface, the support plate lower surface in contact with the cap;

a stop means located between the upper end of the bushing and the housing; and wherein the contact plate is arranged to fit concentrically and with limited axial movability within the annular space of the bushing and below the stop means, and the stop means is located adjacent to the upper end of the bushing to limit the movability of the contact plate toward the end face of the bolt, and where the lower face of the contact plate includes three projecting spikes adapted to make a point contact with the upper surface of the support plate.

12. The device as disclosed in claim 11, wherein the support plate is comprised of metal.

13. The device as disclosed in claim 12, wherein the support plate is comprised of one of brass and zinc.

14. A device as disclosed in claim 1, further including a cap, the cap attached to the housing, and wherein the contact plate is retained adjacent to the mounting loot housing with the aid of the cap.

15. A device as disclosed in claim 1, wherein the anchor bolt has an upper end and a lower end, and further includes one of a contact surface and a threaded section located at the upper end of the anchor bolt.

16. A device as disclosed in claim 1, wherein the bolt includes a portion which is movable within the housing and said portion has a substantially conical form with at least one angle of taper, and wherein said housing defines an internal cavity arranged with a shape corresponding to that of the bolt and having the same at least one angle of taper of the substantially conical portion of the bolt.

17. A device as disclosed in claim 16, wherein the bolt portion which is movable within the housing has a stepped configuration.

18. A device as disclosed in claim 16, further including a bushing, the bushing located within the internal cavity defined by the housing and between the bolt and the housing.

19. A device as disclosed in claim 1, further including a protective facing located on the lower face of the contact plate facing away from the bolt.

20. A device as disclosed in claim 1, wherein the spike consists of a spiked insert piece embedded in the anchor bolt, and wherein the contact plate is provided with a spike counterplate which is fixed in the upper face of the contact plate.

21. A device as disclosed in claim 20, wherein the spiked insert piece and the counterplate are made of a first hard material, while the anchor bolt and the contact plate are made of a second less-hard material.

22. A device as disclosed in claim 21, wherein the spiked insert piece and the counterplate are comprised of steel.

23. A device as disclosed in claim 21, wherein the anchor bolt and the contact plate are comprised of zinc.

24. A device as disclosed in claim 1, further including a cap attached to the housing;

a bushing having an upper end and a lower end and defining an annular space, and the bushing arranged between the housing and the cap and below the end face of the bolt; and a support plate arranged to fit concentrically within the annular space of the bushing and having an upper surface and a lower surface, the support plate lower surface in contact with the cap;

a stop means located between the upper end of the bushing and the housing; and wherein the contact plate is arranged to fit concentrically and with limited axial movability within the annular space of the bushing and below the stop means, and the stop means is located adjacent to the upper end of the bushing to limit the movability of the contact plate toward the end face of the bolt, and where the lower face of the contact plate includes three projecting spikes adapted to make a point contact with the upper surface of the support plate.

25. A device as disclosed in claim 24, wherein the support plate is fixed in the housing with the aid of the cap.

26. The device as disclosed in claim 24, wherein the support plate is comprised of metal.

27. The device as disclosed in claim 26, wherein the support plate is comprised of one of brass and zinc.

28. The device as disclosed in claim 1, wherein the contact plate is comprised of metal.

29. The device as disclosed in claim 28, wherein the contact plate is comprised of one of brass and zinc.

* * * * *